United States Patent
Levine

(10) Patent No.: US 10,520,133 B1
(45) Date of Patent: Dec. 31, 2019

(54) METHOD AND SYSTEM OF MOUNTING A VESDA SYSTEM WITHIN A SUPPORT STRUCTURE

(71) Applicant: Theodore Henri Levine, Midland Park, NJ (US)

(72) Inventor: Theodore Henri Levine, Midland Park, NJ (US)

(*) Notice: Subject to any disclaimer, the term of this patent is extended or adjusted under 35 U.S.C. 154(b) by 0 days.

(21) Appl. No.: 16/017,182

(22) Filed: Jun. 25, 2018

Related U.S. Application Data

(60) Provisional application No. 62/525,802, filed on Jun. 28, 2017.

(51) Int. Cl.
*F16M 11/00* (2006.01)
*F16M 13/02* (2006.01)
*G08B 17/10* (2006.01)

(52) U.S. Cl.
CPC ............. *F16M 13/02* (2013.01); *G08B 17/10* (2013.01)

(58) Field of Classification Search
CPC ....... F16M 13/02; H01R 13/625; A62C 3/004
See application file for complete search history.

(56) References Cited

U.S. PATENT DOCUMENTS

| 5,896,088 | A | 4/1999 | Brooks, Jr. | |
|---|---|---|---|---|
| 7,738,098 | B2 | 6/2010 | Cole | |
| 9,235,970 | B2 | 1/2016 | Williamson | |
| 9,618,440 | B2 | 4/2017 | Williamson | |
| 2009/0126950 | A1* | 5/2009 | Rogers | A62C 35/68 169/46 |
| 2009/0294138 | A1* | 12/2009 | Jackson | A62C 3/004 169/17 |
| 2016/0238495 | A1 | 8/2016 | Joseph | |
| 2017/0045415 | A1 | 2/2017 | Williamson | |
| 2018/0115131 | A1* | 4/2018 | Kohen | H01R 13/625 |

* cited by examiner

*Primary Examiner* — Amy J. Sterling
(74) *Attorney, Agent, or Firm* — Lawrence G. Fridman, Esq.; Feigin & Fridman, LLC

(57) ABSTRACT

A method of mounting a VESDA system, having a flange insert device and series of individual sampling tubes and system components, within a support structure. The method comprises the steps of: cutting an aperture through the support structure; inserting the flange insert device within the surface structure; threading the individual sampling tube through the flange insert device; securing the flange insert device within the system components; affixing the flange insert device to the surface structure; and camouflaging the flange insert device with a respective substance.

18 Claims, 6 Drawing Sheets

METHOD AND SYSTEM OF MOUNTING A VESDA SYSTEM WITHIN A SUPPORT STRUCTURE

CROSS-REFERENCE TO RELATED APPLICATION

The present application claims priority of Provisional Patent Application Ser. No. 62/525,802 filed by the Applicant on Jun. 28, 2017, the entire disclosure of which is hereby incorporated by reference.

FIELD OF THE INVENTION

This invention relates to a method and system of mounting a very early warning and aspirating smoke detection (VESDA) system.

BACKGROUND OF THE INVENTION

Aspirated particle or gas detection systems incorporate a sampling pipe or duct network consisting of one or more sampling pipes or tubes with one or more sampling inlets to collect air samples from various regions being monitored. Air is drawn in through the sampling inlets and through a particle detector and/or gas analyzer at a remote location. In order for the system to effectively monitor the surrounding atmosphere, the sampling tubes must remain free of impediments or blockages. Examples of such VESDA systems are seen in Cole, U.S. Pat. No. 7,738,098, Brooks, Jr., U.S. Pat. No. 5,896,088, and Williamson, U.S. Pat. Nos. 9,618,440 and 9,235,970.

In the past, in order to prevent blockages, the sampling tubes required periodic maintenance, which was labor and cost intensive due to the delicate nature of the tubing and the location of the tubes, often in hard to reach areas. Over the years, several patent applications have been filed that attempt to resolve the difficulties associated with maintaining the sampling tubes. These systems, Williamson, U.S. patent application Ser. No. 15/117,810, and Joseph, U.S. patent application Ser. No. 15/045,468 help to resolve the clogging issues, but are difficult to install and not aesthetically pleasing, as they extend noticeably beyond the surface area surrounding the sampling tube.

VESDA systems rely on air sample inlets that draw air into a particle detector through a pipe type network. These air sample inlets are typically tubular in nature, visible and potentially blocked by construction or other materials during or after installation. VESDA systems are significantly more expensive than individually mounted smoke detector devices due to the nature of the design and detection levels. The VESDA systems attempt to hide within the underlying structure for a more aesthetically pleasing appearance. Cultural, heritage buildings and sites as well as high profile dwellings that require unique fire solutions because of their design, function and age are significant users of VESDA systems. Because of the cultural significance and expensive nature of these support structures, it is highly desired to have a minimally invasive installation and natural appearance at each sampling tube location.

The disclosed invention provides a method and system of mounting a VESDA system within a support structure that simplifies installation, prevents obstruction and is aesthetically pleasing. The present invention provides an easy to install, cost effective solution that restricts obstructions of the sampling tubes, thereby forming a novel and complete solution to the difficulties associated with the prior art. The significant difference between the present invention and the prior art is the use of an easy to install device that protects the sampling tube from exposure and obstructions, while blending into the underlying structural aesthetic. Further, the present invention is installed using common, readily available construction materials such as spackle or joint compound and does not require any specialized tools.

The present invention provides a flange device having a tapeable edge compatible with a VESDA sampling tube system. The flange is affixed to the support structure, interconnected with the VESDA tubing system, and then camouflaged with spackle or similar material that blends into the existing support structure. Once installation is complete, only a small aperture in the support structure is visible.

The present invention provides a complete solution that resolves the prior art issues of remote sampling tube obstructions and aesthetically pleasing installation. Benefits of this novel invention are easily seen in novel building designs requiring unique solutions.

SUMMARY OF THE INVENTION

For purposes of this description, the terms "upper," "bottom," "right," "left," "front," "vertical," "horizontal," and derivatives thereof shall relate to the invention as oriented in figures of the drawing.

As to a further description of the manner and use of different embodiments of the present invention, the same should be apparent from the above description. Accordingly, no further discussion relating to the manner of usage and operation of the embodiments different from that discussed below will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

BRIEF DESCRIPTION OF THE DRAWINGS

In the following drawings, the same parts in the various views are afforded the same reference designators. Referring now to the drawings which are provided to illustrate and not to limit the invention, wherein.

DETAILED DESCRIPTION OF THE INVENTION

Figure 1:
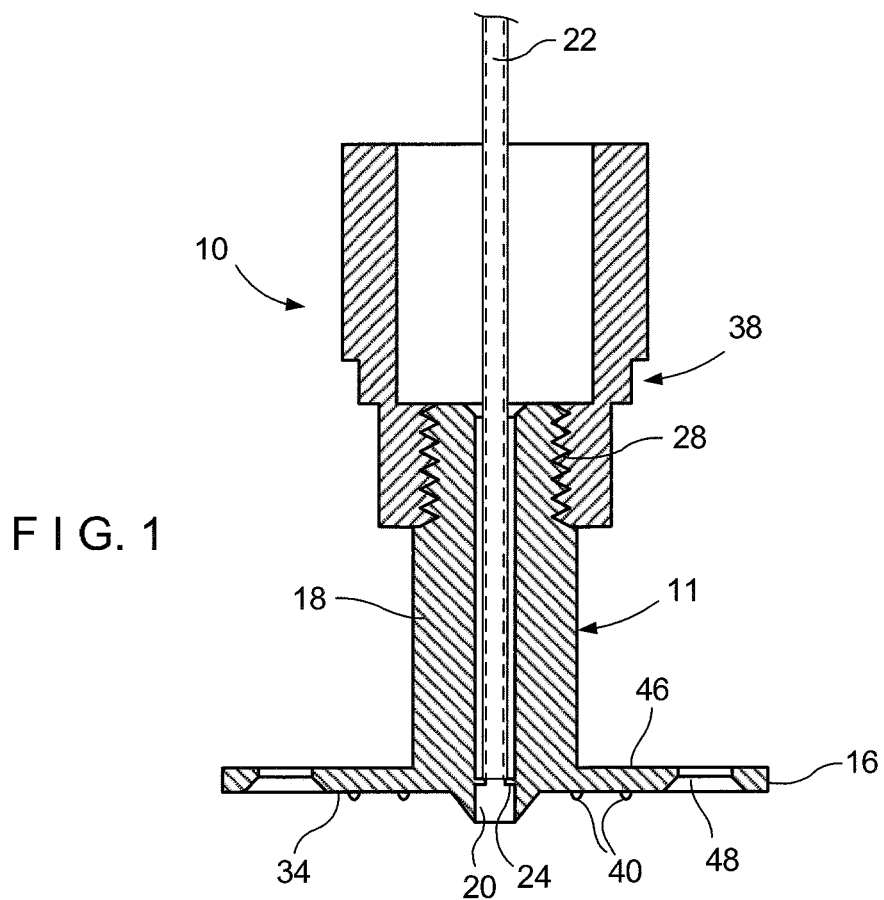
FIG. 1 is a cross-sectional view of one embodiment the present VESDA mounting system having the sampling tube set within the system.
Figure 2:
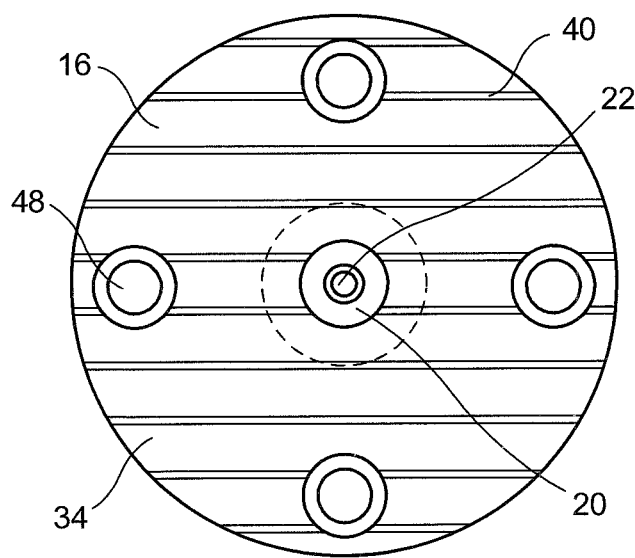
FIG. 2 is a bottom view of the present VESDA mounting system.
Figure 3:
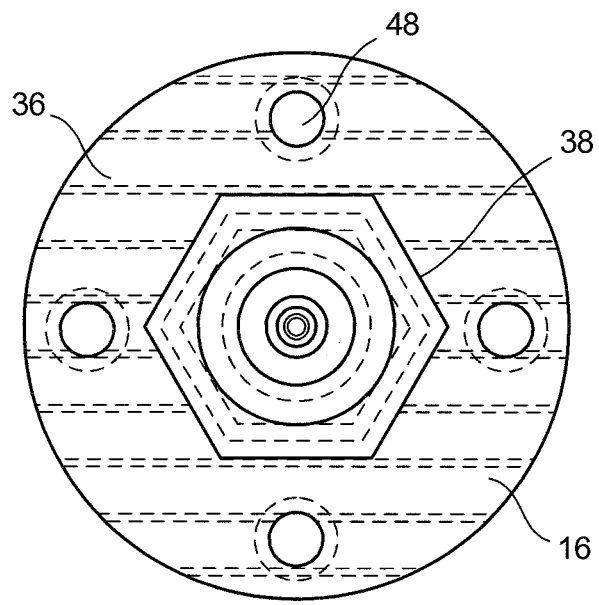
FIG. 3 is a top view of the present VESDA mounting system.
Figure 5:
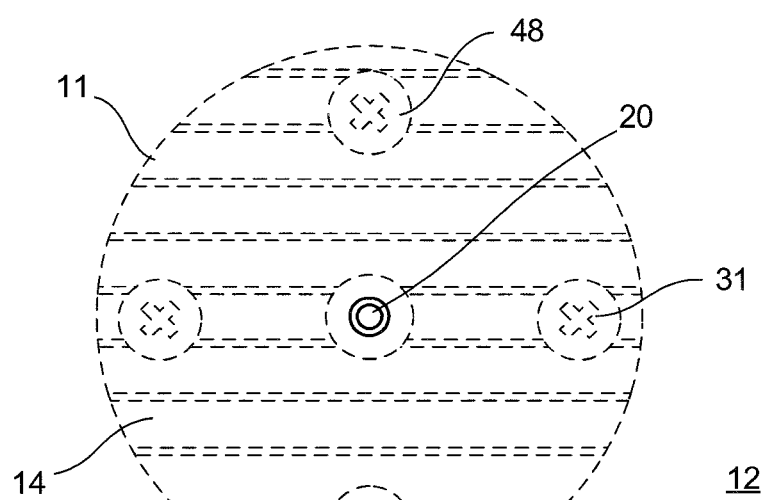
FIG. 5 is a bottom view of the VESDA mounting system attached to the support structure and finished to match the support structure.

In the embodiment described herein, the present invention provides for a system and method of mounting a VESDA system in a structure to create an aesthetically pleasing finish that prevents sampling tube obstruction. The unique design combines a flange design with the sampling tube VESDA system. This cost effective novel invention provides ease of installation and obstruction prevention combined with common, readily available finishing products to create a camouflaged surface that blends with the existing structural surface.

Before proceeding to the detailed description, the following definition relates to the present invention. VESDA is defined as a very early warning aspirating smoke detection solution that provides continuous air sampling and warns of an impending fire hazard. VESDA is manufactured by Xtralis Pty Ltd. For the purposes of this application, VESDA is further defined to include similar systems manufactured by Xtralis or others that include a sampling tube and/or particle collection arrangement.

The description which follows is of the first embodiment of the method and system of mounting a VESDA system within a support structure of this invention. Referring now to FIGS. 1 through 5, the first embodiment of the flange insert device is generally referred to by the number 10. As set forth in FIG. 4, the flange insert device 11 is typically embedded within the support structure 12 and camouflaged through the use of joint compound, spackle or similar substance 14 to match the existing structure surface 12. The support structure 12, as discussed, is a sheetrock substance, however, any conventional support structure including plaster, wood, metal, stone and the like forms a part of the invention.

The flange insert device 11 is comprised of a base section 16. The base section 16 is shown as circular in nature, however variations include oval, square, rectangular or similar shaped sections. In one of the circular form embodiment, the base section 16 is approximately 2 inches in diameter. The base section 16 is adjacent to an extension 18 having an aperture 20 therethrough to accept the VESDA sampling tube 22 and an outer diameter of approximately 5/16 of an inch. In one embodiment of the invention the extension 18 is formed having substantially cylindrical configuration. The extension 18 optionally includes a slightly tapered end (not shown). The extension 18 is configured to be inserted within the VESDA system components 38.

Figure 4:
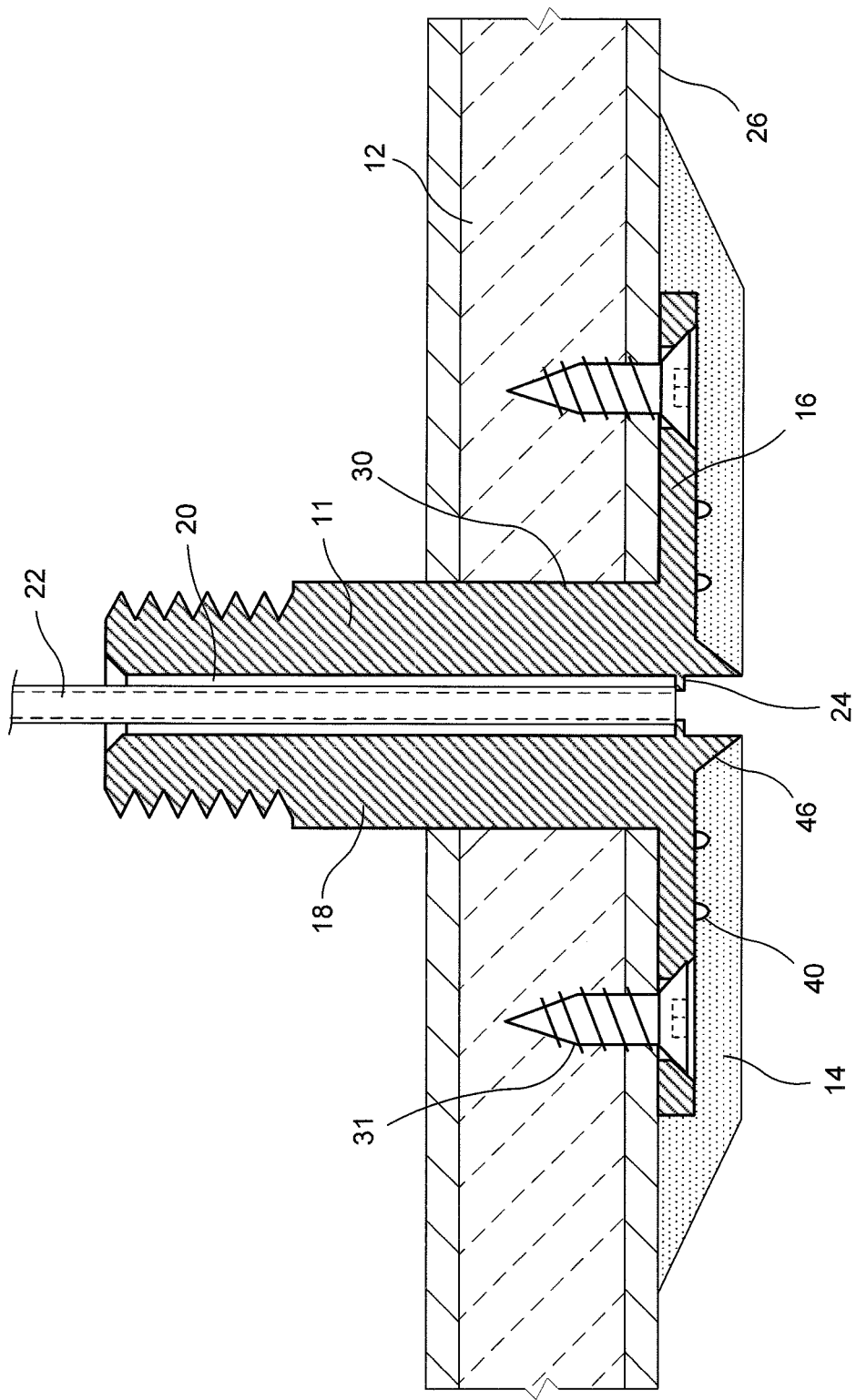
FIG. 4 is a cross-sectional side view of one embodiment of the present VESDA mounting system set within the support structure and affixed thereto by a fastening arrangement and having the sampling tube set within the system.

As best illustrated in FIGS. 1 and 4 the aperture 20 passes through the extension 18, including the base 16. The base section 16 optionally contains extensions 24, extending inwardly within the aperture 20, to ensure that the sampling tube 22 does not extend to the exterior surface 34, and does not exceed the exterior surface 26 of the support structure 12. The cylindrical extension 18 contains optional threading 28 to assist in securely installing the flange insert device 11 within the support structure 12 and the VESDA system components 38. The flange insert device 11 is comprised of any material suitable for the support structure 12 including aluminum, steel, wood, plastics and similar.

Figure 8:
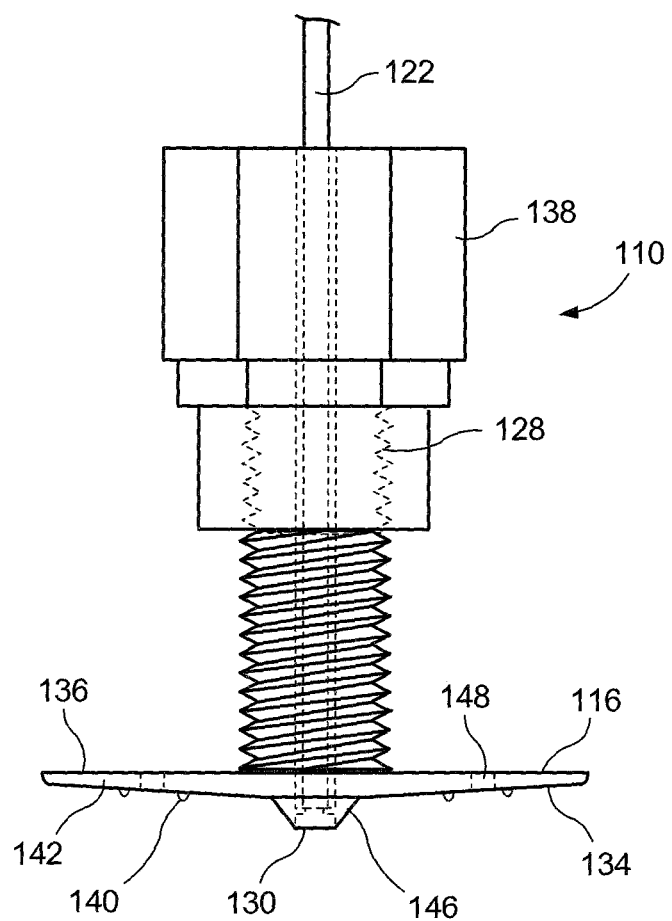
FIG. 8 is a side view of another embodiment of the present VESDA mounting system showing the sampling tube set mounted within the system.

In the illustrated embodiment of the flange insert device 11 base section 16 is approximately 1/16 of an inch in thickness and is either uniformly thick (See FIG. 1) or contains a tapered edge 42 (See FIG. 8). Other configurations and dimensions of the base section are within the scope of the invention. The base section 16 has at least 2 two apertures 48 therethrough for receipt of fastening devices 31. Each aperture 48 is approximately inch in diameter. The base section 16 has an exterior surface 34 and an interior surface 36 and is installed within the support structure 12 through an aperture 30 in the support structure 12 of approximately 1 inch in diameter. The flange insert device 11 is secured within and affixed to the support structure 12 through the use of fastening devices 31 such as screws or nails (generally 2 to 4 fastening devices 31) or through the use of any conventional adhesive substance associated with the interior surface 36 (not shown).

The exterior surface 34 includes a raised flange section or lip 46 that surrounds outer or distal end of the aperture 20. In one embodiment the lip 46 extends approximately 1/8 of an inch from the exterior surface 34. The raised flange section 46 is critical to prevent obstructions from entering the sampling tube 22. Furthermore, upon installation the lip 46 is designed to accept a predetermined amount (1/8 of an inch, for example) of a camouflaging substance 14 such as joint compound, spackle or similar. As illustrated in FIG. 4, in the installed condition, an exterior surface of the substance 14 is in flash with or does not extend beyond an outer edge of the lip 46. The exterior surface 34 contains ribbing 40 to assist with the adherence of the camouflaging substance 14. In the illustrated embodiment, the ribbing 40 takes the form of linear indentations, random or patterned indentations, or nodules (not shown). Other forms of ribbing are also contemplated. When the base section is installed, and the camouflaging substance 14 applied, such base section combination is smoothly transferred into the exterior surface 26 of the support structure or is in flash with the exterior surface of the support structure. This arrangement substantially improving appearance of the outer area of the VESDA system.

The flange insert device 11 is configured to be installed within the VESDA system components 38. The threaded interconnection component 28 is compatible with the VESDA system components and secured therewithin.

Figure 6:
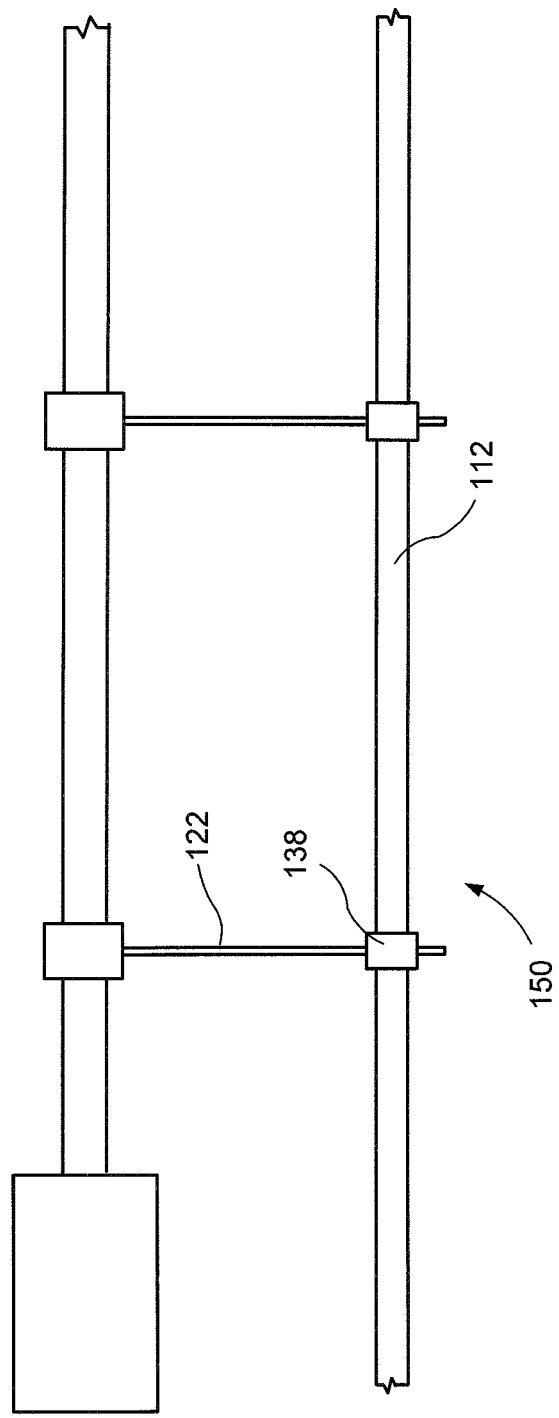
FIG. 6 is a prior art diagram of a VESDA detection system.
Figure 7:
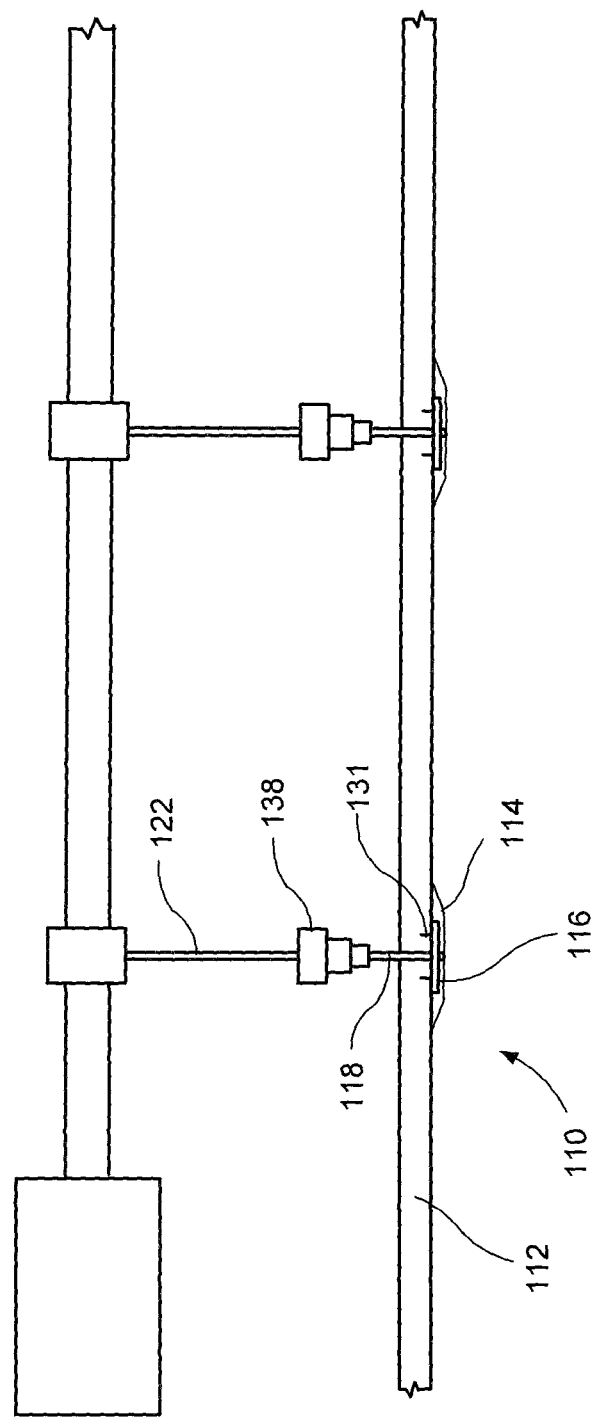
FIG. 7 is an isometric view of the present VESDA mounting system installed within the exterior structure and finished to match the exterior structure.

The description which follows is of a second embodiment of the method and system of mounting a VESDA system within a support structure. For ease of comprehension, where similar parts are shown, reference designators "100" units higher than those previously employed are used. Thus, the flange insert device 111 of the second embodiment is analogous to the flange insert device 11 of the first embodiment. Referring now to FIGS. 6 to 8 the second embodiment of the method and system of mounting a VESDA system within the support structure is shown and is referred to generally by the numeral 110.

The prior art relating to the present invention is shown in FIG. 6 and represented by numeral 150. As seen in the prior art VESDA system 150, the system exceeds the surface structure 112. This exceedance is visible and aesthetically displeasing. In historically and artistically significant structures, a high importance is placed on visible appearance and safety. The VESDA system in conjunction with the present invention resolves the safety and aesthetic issues in such structures.

As shown in FIG. 7, the system 110 of present invention is camouflaged within and against the support structure 112. The flange insert device 111 is shown embedded within the support structure 112 and camouflaged through the use of joint compound, spackle or similar substance 114 to match the existing structure surface. The support structure 112 is shown as a sheetrock substance, however, any number of surfaces including plaster, wood, metal, stone and similar are included.

The flange insert device 111 is comprised of a base section 116. The base section 116 is shown as circular in nature, however variations include oval, square, rectangular or similar shaped sections. In circular form, the base section 116 is approximately 2 inches in diameter. As also illustrated in FIG. 8, the base section 116 is adjacent to an extension 118 having an aperture 120 therethrough to accept the VESDA sampling tube 122 therethrough. In one embodiment an outer diameter of the base section 116 is approximately 5/16 of an inch. The extension 118 optionally includes a slightly tapered end. The extension 118 is configured to be inserted within the VESDA system components 138.

Similar to the previously discussed embodiment (See FIG. 4), the base section 116 optionally contains extensions 24 to ensure that the sampling tube 122 does not exceed the exterior surface 126 of the support structure 112. The extension 118 contains optional threading 128 to assist in securely installing the flange insert device 111 into the support structure 112 and within the VESDA system components 138. The flange insert device 111 is comprised of any material suitable for the support structure 112 including aluminum, steel, wood, plastics and similar.

In one modification the flange insert device 111 base section 116 is approximately 1/16 of an inch in thickness and is either uniformly thick (See FIG. 1) or contains a tapered edge 142 (See FIG. 8). The base section 116 has at least 2 two apertures 148 therethrough for receipt of fastening devices 131. In the above discussed modification, each aperture 148 is approximately inch in diameter. The base section 116 has an exterior surface 134 and an interior surface 136 and is installed within the support structure 112 through the aperture in the support structure 112, which can be approximately 1 inch in diameter. The flange insert device 111 is secured within and affixed to the support structure 112 through the use of a fastening arrangement. As illustrated, the fastening arrangement can be in the form of fastening devices 131 such as screws or nails (generally 2 to 4 fastening devices 131) or through the use of an adhesive substance associated with the interior surface 136 (not shown).

The exterior surface 134 includes a raised flange section or lip 146, which can be circular in nature. In one embodiment the lip 146 extends approximately ⅛ of an inch from the exterior surface 134. The flange section is critical to preventing obstructions from entering the sampling tube 122. In one application the lip 146 is designed to accept ⅛ of an inch of a camouflaging substance 114 such as joint compound, spackle or similar. The exterior surface 134 contains ribbing 140 to assist with the adherence of the camouflaging substance 114 (See FIGS. 2, 3). In one of the embodiments, the ribbing 140 takes the form of linear indentations, random or patterned indentations, or nodules (not shown).

With respect to the embodiment of FIGS. 1-5, the method of installing the flange insert device 11 includes the following steps: cutting the aperture 30 in the support structure 12 (in the illustrated embodiment the aperture 30 can be an approximately 1 inch in diameter); inserting the flange device 11 within the support structure 12 through the aperture 30; positioning/threading the sampling tube 22 into the aperture 20 of the extension 38; securing the cylindrical extension 18 within the VESDA system components 38; affixing the flange insert device 11 to the support structure 12 through the use of fastening devices 31; camouflaging the flange insert device 11 with approximately ⅛ of an inch of a camouflaging substance 14 such as joint compound, spackle, or similar does not extend beyond the lip 46; and ensuring that the aperture 20 in the extension 38 is not obstructed, and also insuring that the exterior surface 34 of the base section 16 as well as the camouflaging substance is smoothly transferred into (or in flash with) the exterior surface 26 of the structure 12.

As to the embodiment of FIGS. 7 and 8, the method of installing the flange insert device 111 is similar to the above-discussed and includes the following steps: cutting the aperture 130 in the surface structure 112; inserting the flange insert device 111 within the surface structure 112; threading the sampling tube 122 into the cylindrical extension 138; securing the cylindrical extension 118 within the VESDA system components 138; affixing the flange insert device 111 to the surface structure 112 by any conventional means or through the use of fastening devices 131; camouflaging the flange insert device 111 with the camouflaging substance 114 such as joint compound, spackle, or similar, wherein the camouflaging substance 114 does not extend beyond the lip 146; and, ensuring that the aperture 120 in the cylindrical extension 138 is not obstructed, and also insuring that the exterior surface 134 of the base section as well as the camouflaging substance is smoothly transferred into (or is in flash with) the exterior surface of the structure 112.

The present system and method of installing the flange insert device 111 is economical and easy to install. Installation requires simple readily available tools and supplies and provides an aesthetically pleasing finish.

The disclosed invention provides a unique aesthetically-pleasing solution to installing and camouflaging a VESDA system within a support structure. Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

What is claimed is:

1. A method of mounting and using a Very Early warning aspirating Smoke Detection Apparatus (VESDA) system within a support structure, the VESDA system having a flange insert device, individual sampling tubes and additional system components, wherein the flange insert device comprises:
a planar base section having a central aperture, said planar base section having a first surface and a second surface disposed opposite to each other;
a longitudinal portion extending outwardly from said first surface of said planar base section and having an aperture therethrough, said aperture of said longitudinal portion being aligned with said central aperture of said planar base section; and
a flange section extending outwardly from said second surface of said base section opposite said longitudinal portion, said flange section having an aperture therethrough, said aperture of said flange section being aligned with said central aperture of said base section and with said aperture of said longitudinal portion;
said method comprising the steps of:
(a) cutting an aperture through said support structure;
(b) inserting said longitudinal portion of said flange insert device into said support structure through said aperture in said support structure, while keeping said planar base section outside of said support structure thereby to prevent obstruction of said one of said individual sampling tubes;
(c) threading one of said individual sampling tubes through said flange insert device;
(d) securing said flange insert device to said additional system components;
(e) affixing said flange insert device to said support structure, such that said first surface of said planar base section engages an outer surface of said support structure, surrounding said aperture of said support structure, and is visible to a person looking at said support structure;
(f) engaging a camouflaging material to said second surface of said planar base section of said flange insert device, thereby to camouflage said VESDA system installed in said support structure and to create a surface that blends with the support structure; and,
(g) following said engaging of said camouflaging material, operating said VESDA system by continuously sampling air via said one of said individual sampling tubes and, based on said continuous sampling, warning of an impending fire hazard when such occurs.

2. The method of mounting a VESDA system of claim 1, wherein:
said planar base section of said flange insert device includes a set of apertures extending therethrough, and
said VESDA system further includes a set of fastening devices; and
said affixing said flange insert device to said support structure comprises affixing said set of fastening devices to said set of apertures of said planar base section.

3. The method of mounting a VESDA system of claim 1, wherein said planar base section has a thickness of approximately 1/16 inch.

4. The method of mounting a VESDA system of claim 1, wherein said longitudinal portion is generally cylindrical and said flange section is generally circular.

5. The method of mounting a VESDA system of claim 1, wherein said camouflaging material is formed of one or more materials selected from the group consisting of joint compound, spackle, and materials matching said support structure.

6. The method of mounting a VESDA system of claim 1, wherein said flange section extends an 1/8 of an inch outwardly from said second surface of said planar base section.

7. The method of mounting a VESDA system of claim 1, wherein said cutting an aperture through said support structure comprises cutting an aperture having a diameter equal to, or nominally larger than, a diameter of said longitudinal portion and smaller than a diameter of said planar base section.

8. The method of mounting a VESDA system of claim 1, wherein said inserting said longitudinal portion of said flange insert device into said support structure includes positioning said longitudinal portion within said aperture of said support structure aperture, so that said longitudinal portion is ready to be secured to said additional system components.

9. The method of mounting a VESDA system of claim 1, wherein said threading one of said individual sampling tubes through said flange insert device comprises threading said one of said individual sampling tubes through said aperture of said longitudinal portion and fixing said one of said individual sampling tubes therewithin.

10. The method of mounting a VESDA system of claim 1, wherein:
said flange section surrounds said central aperture of said planar base section such that a cylindrical wall of said aperture of said flange section is flush with a cylindrical wall of said central aperture, and
said engaging a camouflaging material to said second surface of said planar base section comprises applying said camouflaging material such that a radially interior surface of the camouflaging material does not extend beyond a radial outer edge of said flange section, thereby preventing the camouflaging material from entering said central aperture of said planar base section and said one of said individual sampling tubes.

11. The method of mounting a VESDA system of claim 1, wherein said second surface of said base section is tapered in a radially outward direction.

12. A method of mounting and using a Very Early warning aspirating Smoke Detection Apparatus (VESDA) system within a ceiling, the VESDA system having a flange insert device, individual sampling tubes and additional system components, wherein the flange insert device comprises:
a planar base section having a central aperture, said planar base section having a first surface and a second surface opposite to each other;
a longitudinal portion extending outwardly from said first surface of said planar base section and having an aperture therethrough, said aperture of said longitudinal portion being aligned with said central aperture of said planar; and
a flange section extending outwardly from said second surface of said planar base section opposite said longitudinal portion, said flange section having an aperture therethrough, said aperture being aligned with said central aperture of said base section and with said aperture of said longitudinal portion;
said method comprising the steps of:

(a) cutting an aperture through said ceiling;
(b) inserting said longitudinal portion of said flange insert device into said ceiling through said aperture in said ceiling, while keeping said planar base section outside of said ceiling thereby to prevent obstruction of said one of said individual sampling tubes;
(c) threading one of said individual sampling tubes through said flange insert device;
(d) securing said flange insert device to said additional system components;
(e) affixing said flange insert device to said ceiling, such that said first surface of said planar base section engages an outer surface of said ceiling, surrounding said aperture of said ceiling;
(f) engaging a camouflaging material to said second surface of said planar base section of said flange insert device, thereby to camouflage said VESDA system installed in said ceiling and to create a surface that blends with said ceiling; and,
(g) following said engaging of said camouflaging material, operating said VESDA system by continuously sampling air via said one of said individual sampling tubes and, based on said continuous sampling, warning of an impending fire hazard when such occurs.

13. The method of mounting a VESDA system of claim 1, wherein a diameter of said planar base section is significantly greater than a diameter of said longitudinal portion.

14. The method of mounting a VESDA system of claim 1, wherein a longitudinal length of said aperture of said longitudinal portion is significantly greater than a longitudinal length of said central aperture of said planar base section.

15. The method of mounting a VESDA system of claim 1, wherein a diameter of said longitudinal portion is greater than a diameter of said flange section.

16. The method of mounting a VESDA system of claim 10, wherein said flange section includes a tapered wall, tapering radially outwardly from said edge of said aperture of said flange section to an outer edge of said flange section.

17. The method of mounting a VESDA system of claim 1, wherein said planar base section, said longitudinal portion, and said flange section are integrally formed form a single piece of material.

18. The method of mounting a VESDA system of claim 1, wherein said central aperture of said planar base section, said aperture of said longitudinal portion, and said aperture of said flange section form a single passageway adapted to receive said one of said individual sampling tubes, said single passageway having a smooth interior surface.

* * * * *